United States Patent
Colucci

[15] 3,695,695
[45] Oct. 3, 1972

[54] SEAT FOR MOTOR VEHICLES
[72] Inventor: Ivo Colucci, Milan, Italy
[73] Assignee: Alfa Romeo S.p.A., Milan, Italy
[22] Filed: March 18, 1970
[21] Appl. No.: 20,529

[52] U.S. Cl. ................................................297/341
[51] Int. Cl. ................................................A47c 1/02
[58] Field of Search ......................297/340, 341, 379

[56] References Cited

UNITED STATES PATENTS 2,856,983   10/1958   Probst et al.................297/341

Primary Examiner—James C. Mitchell
Attorney—Holman & Stern

[57] ABSTRACT

A seat in particular a front seat for motor vehicles provided with a hinged tiltable back in which as the back tilts there is a corresponding sliding displacement of the seat in the same direction, and likewise on restoring the back into the normal position there is a corresponding sliding displacement of the seat in the direction opposite the preceding, thereby to provide better access for any back seats in two-doored motor vehicles.

4 Claims, 4 Drawing Figures

INVENTOR.
Ivo Colucci

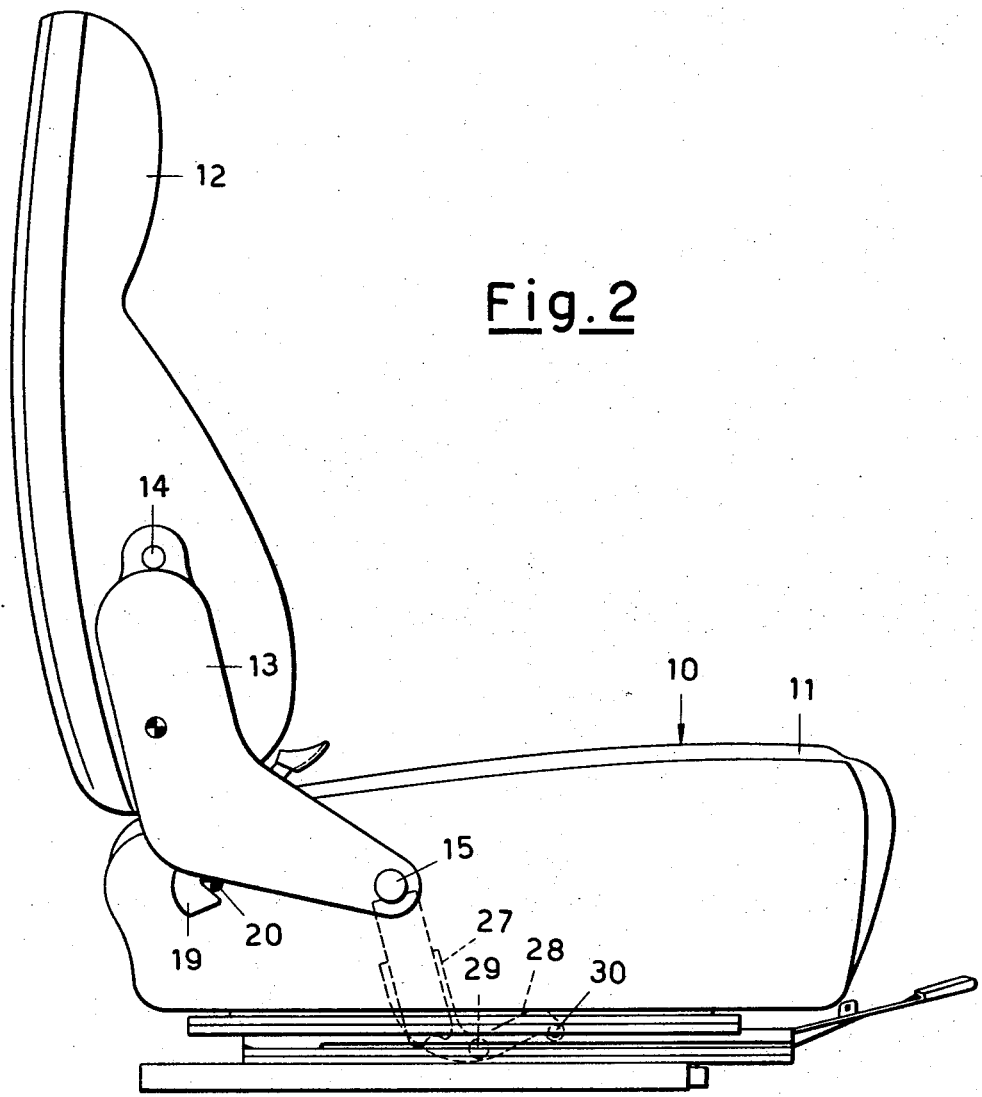

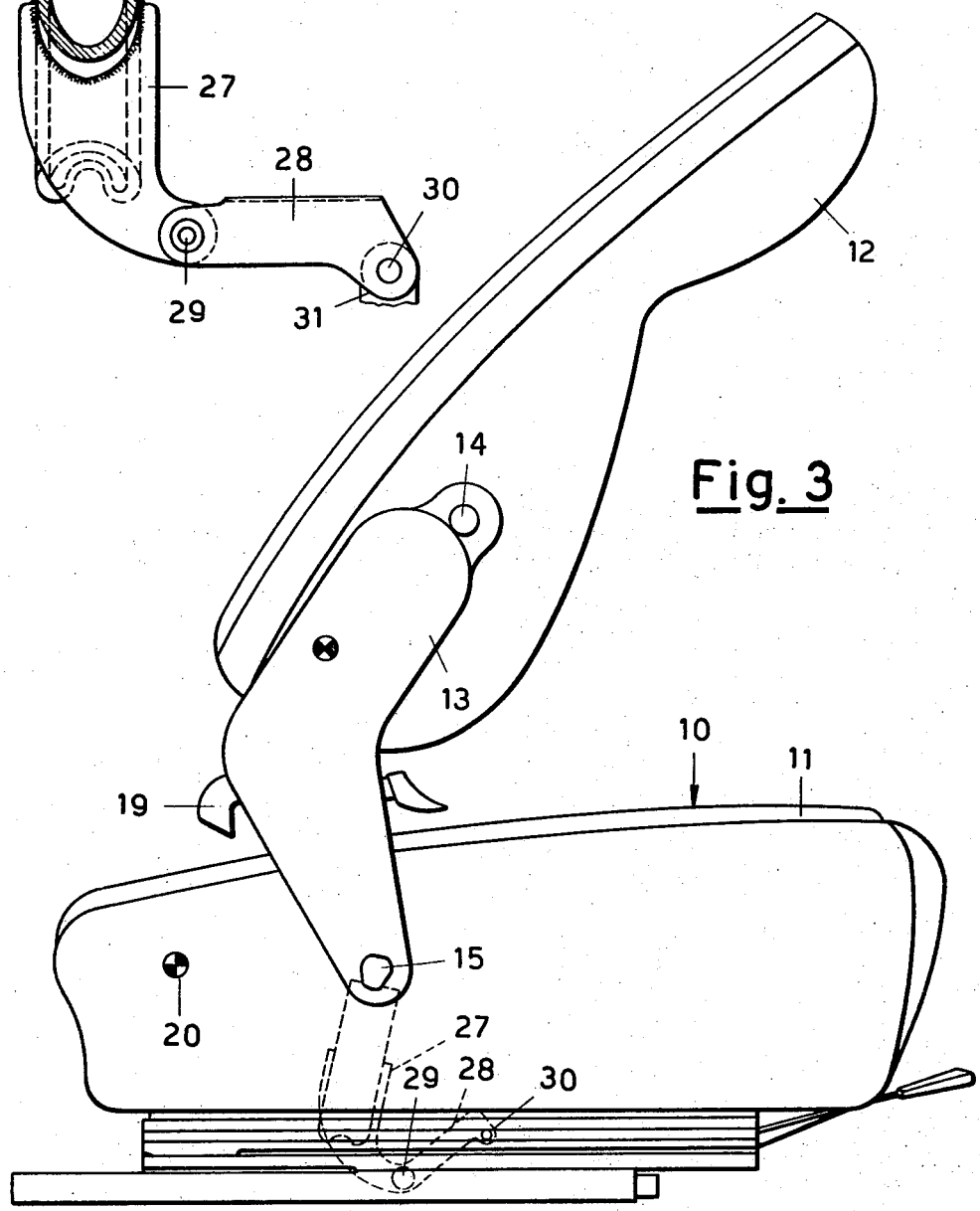

SEAT FOR MOTOR VEHICLES

The present invention relates to a seat for motor vehicles particularly suitable for use as a front seat of two door motor vehicles.

It is well known that in two door motor vehicles, the backs of the front seats are tiltably hinged principally for the purpose of being able to have access to the back seats.

However even on tilting the backs of the front seats, access to the back seats of the motor vehicle is relatively difficult because the back ends of the front seats may partly obstruct the access thus rendering access more difficult.

The object of this invention is to obviate this this disadvantage, this object being attained by providing a seat with a back which can tilt towards a seat base in which as the back tilts there is a corresponding sliding seat of the generally in the same direction, and likewise on raising the back into the normal position there is a corresponding sliding of the seat in the direction opposite the preceding.

These and other characteristics of the invention will be evident from the following description made by way of example with reference to the accompanying drawings in which:

FIG. 2 is a lateral elevational view of the seat of FIG. 1 in the normal position;

FIG. 3 is a lateral elevational view of the seat with its back in a tilted position and its seat consequently moved forward;

FIG. 4 is a detailed view of the control lever mechanism for sliding the seat.

Figure 1:
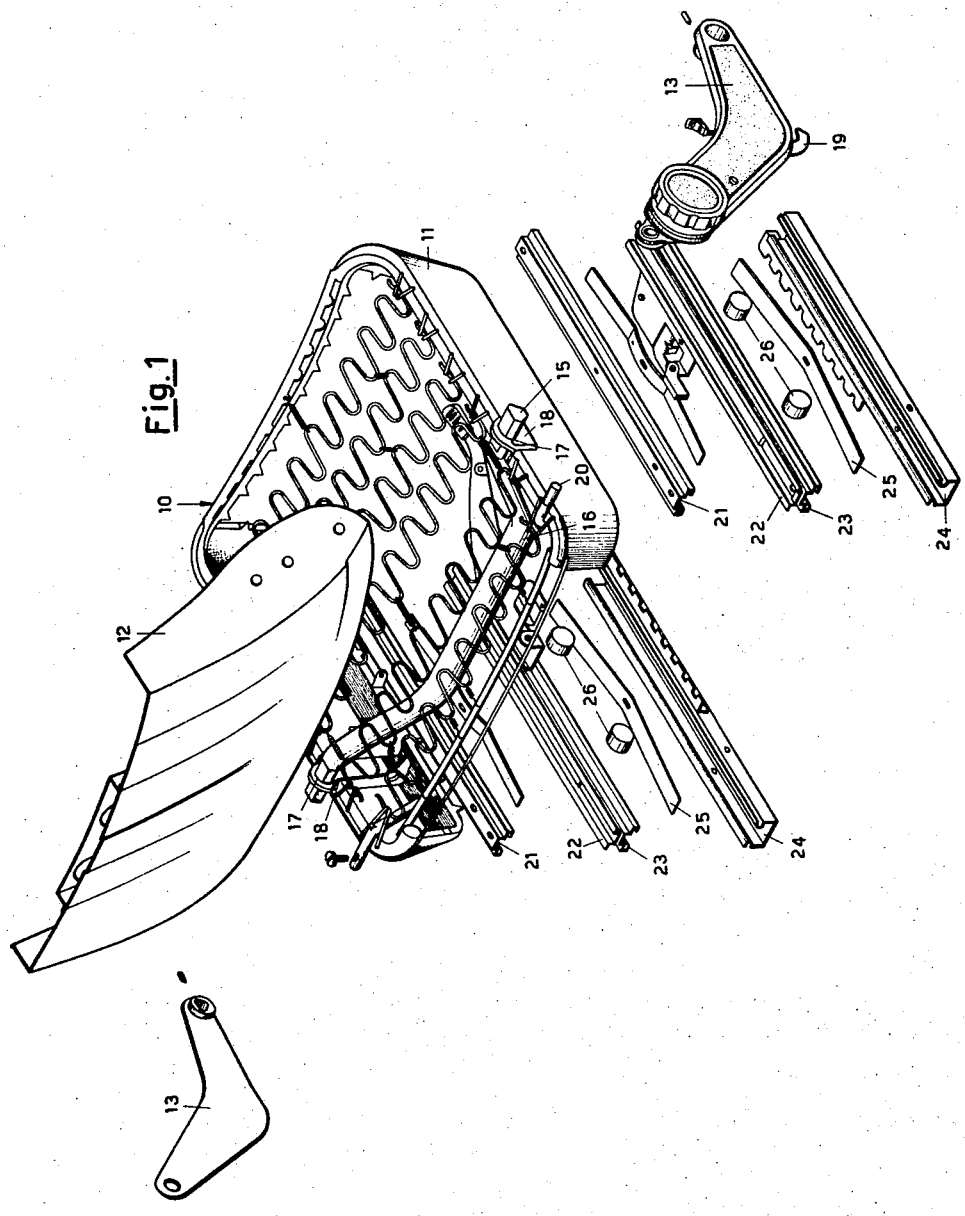
FIG. 1 is a perspective exploded view of a seat according to the invention.

With reference to the drawings, a front seat for motor vehicles constructed according to the present invention is generically indicated by the reference numeral 10, and comprises an actual seat portion 11 and a back 12.

The seat portion 11 and its back 12 are connected together on each side by means of an angular member 13.

Each member 13 is fixed at one end at the point 14 to the back 12 and at the opposite end to a polygonal pivot 15 provided at the extremities of a bar 16, said pivots 15 being inserted in a loose manner in holes 17 in brackets 18 fixed to the sides of the seat 11, as is clearly illustrated in FIG. 1.

In this manner the back 12 is tiltable with respect to the seat 11.

One of the members 13 is further provided with a device 19 of conventional type, for engaging a pivot 20 rigid with the seat slidably inserted when the back 12 is in the open position.

Guides 21 are fixed below on opposing sides of the seat 11 and are slidably inserted in guides 22 which are rigid with guides 23, which are slidably inserted and secured in guides 24 which are in turn fixed to the floor of the motor vehicle.

The guides 23 slide on the guides 24 with resilient strips 25 and rollers 26 interposed between them.

Said guides 23 and 24 serve for adjusting and securing the position of the seat on the floor of the motor vehicle in a manner well known to persons in this field.

The guides 21 aNd 22 serve for sliding the seat 11 according to the invention forwards and backwards, forwards when the back 12 is tilted to the position shown in FIG. 3 and backwards when it is returned to the position shown in FIG. 2, said sliding being performed and controlled in the following manner.

In opposing positions on said bar 16 close to the sides of the seat 11, two members 27 are fixed by welding and having two levers 28 pivoted at 29 to their free ends, said levers 28 being rotably pivoted at 30 to fixed supports 31 rigid with the guides 22 and 23 which are themselves stationary. The FIGS. 2 and 4 show only one of the two lever mechanisms described, for simplicity of drawing.

Sliding of the seat 11 takes place in the following manner. From the drawings it is seen that the two angular members 13, the pivots 15, rotate about 30 as the hinge when the back 12 is tilted forward, and while doing so tend to move pivots 15, which are fastened with the seat 11 through an arc. The seat 11 since it is constrained to move only linearly by means of guides 21, 22, moves forward, the movement being made possible by the pivot 29 receding down. Thereby, tilting the back 12 from a position shown in FIG. 2 to that in FIG. 3 causes an associated forward sliding movement of the seat 11. On restoring the back 12 to its original position, the linkwork movement is retraced whereby the seat 11 is retracted horizontally to its original position.

Naturally when sliding of the guides 23 on the guides 24 is blocked and the device 19 is hooked to the pivot 20, the whole of the seat is rigidly fixed to the floor of the motor vehicle.

What we claim is:

1. In a front seat of a motor vehicle, of the type having a seat cushion and a hinged tiltable back to provide access to a rear seat of the vehicle, the improvements comprising means provided in the front seat construction, which means cause a forward sliding displacement of the seat cushion parallelly to the floor of the vehicle upon forward tilting the tiltable back, said means comprising first and second guides at each side of the seat, each guide comprising a fixed first part and a movable second part, the fixed part of the first guide being rigidly secured to the floor of the vehicle, the fixed part of the second guide being rigid with the movable part of the first guide, which movable part is movably secured to its first part rigid with the vehicle floor, the movable part of the second guide being in turn rigidly secured to the seat cushion; releasable hook means provided between the back and the cushion of the seat to secure the two in their normal position; two levers, one each respectively secured to the sides of the back, a crossbar having two pivots disposed so as to rigidly connect to each other said two levers and secured at two points to the sides of the seat construction so that these two levers are enabled to have angular movement on tilting the tiltable back; the lower ends of said two levers being secured by connecting means to the fixed part of the second guide, so that said ends can be prevented from performing substantial displacements with respect to the above said fixed part, parallelly to the guides, and the seat cushion is caused to move slidingly forward on tilting of the tiltable back.

2. The seat according to claim 1 wherein the connecting means consist of two links, one end of each link being pivoted to the lower end of the corresponding lever, and the other end being pivoted to the said fixed part of the second guide.

3. The seat according to claim 1, further comprising a locking member which is pivotally mounted to one of said levers and is engageable with a fixed stop member, integral with the seat cushion, the locking member being engaged when the hinged seat back is in the normal position and being manually disengaged for tilting the tiltable back of the seat.

4. The seat as claimed in claim 1, wherein said guides, the cross bar with two pivots and said connecting means are all located substantially below the seat and are concealed.

* * * * *

UNITED STATES PATENT OFFICE
CERTIFICATE OF CORRECTION

Patent No. 3,695,695      Dated October 3, 1972

Inventor(s) IVO COLUCCI

It is certified that error appears in the above-identified patent and that said Letters Patent are hereby corrected as shown below:

[30] Foreign Application Priority Data

October 22, 1969   Italy   23725 A/69

Signed and sealed this 6th day of March 1973.

(SEAL)
Attest:

EDWARD M. FLETCHER, JR.
Attesting Officer

ROBERT GOTTSCHALK
Commissioner of Patents